April 22, 1941.  F. ROBERTS  2,239,573
DEPTHOMETER
Filed July 11, 1940

Floyd Roberts,
INVENTOR
BY Victor J. Evans & Co.
ATTORNEYS

Patented Apr. 22, 1941

2,239,573

UNITED STATES PATENT OFFICE 2,239,573

DEPTHOMETER

Floyd Roberts, Bismarck, N. Dak.

Application July 11, 1940, Serial No. 344,973

1 Claim. (Cl. 33—169)

This invention relates to a depthometer and has for an object to provide a simplified device for accurately measuring the thickness of thin materials, such as paint, varnish and other preservative coatings, papers, cloth, etc.

A further object is to provide a device of this character which will readily and accurately indicate to the eye minute differences in thickness of the work to be tested and for this purpose makes use of movement of liquid in a transparent tube as the indicating element.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figures 1, 2, 3, 4, 5:
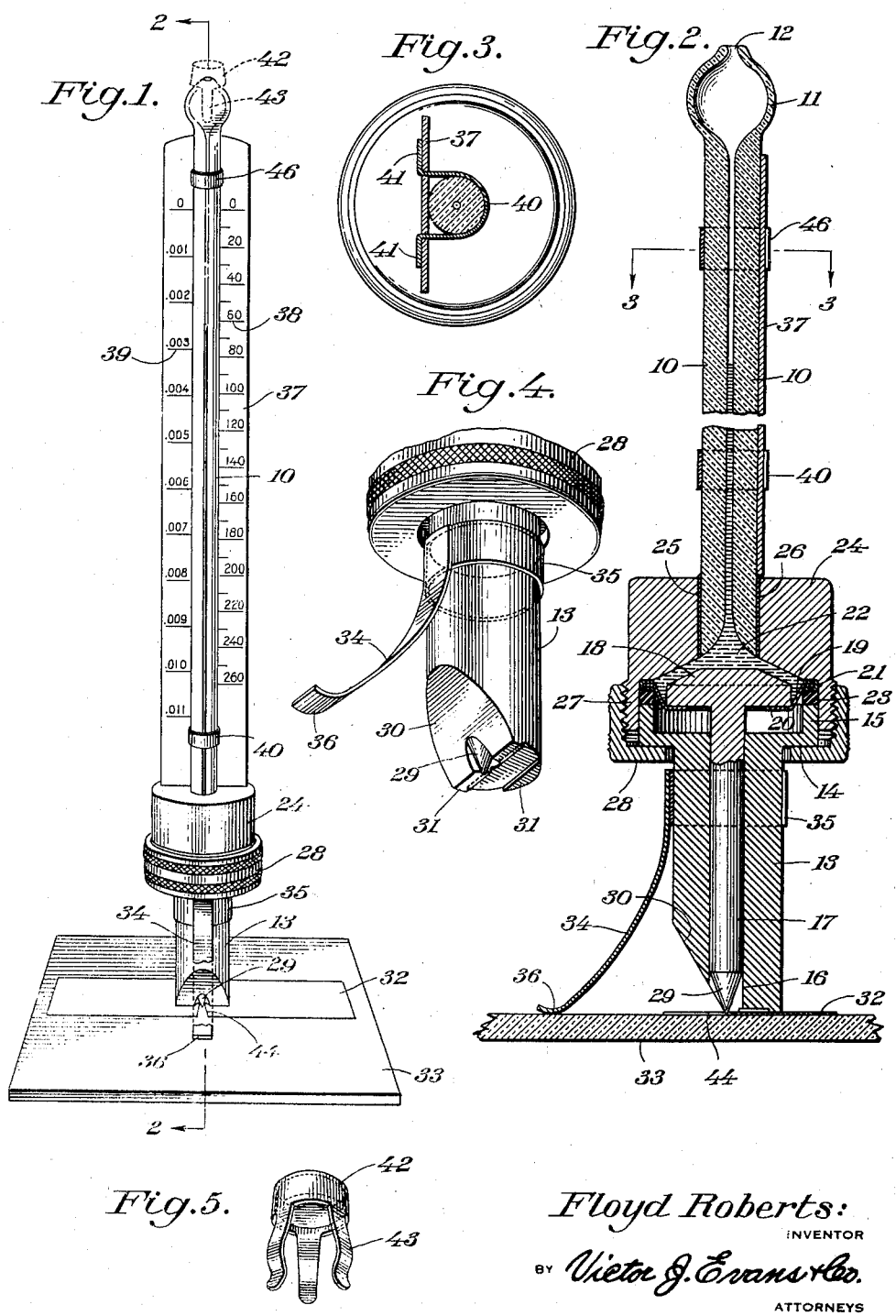
Figure 1 is a perspective view of a depthometer, constructed in accordance with the invention, in applied position to measure a preservative coating of paint on a sheet of glass.
Figure 2 is a longitudinal sectional view taken on the line 2—2 of Figure 1.
Figure 3 is a cross sectional view taken on the line 3—3 of Figure 2.
Figure 4 is a detail perspective view showing the base, resilient leg and adjusting ring of the depthometer.
Figure 5 is a perspective view of the cap for closing the bulb opening.

Referring now to the drawing in which like characters of reference designate similar parts in the various views, 10 designates a transparent glass tube having an integral bulb 11 at the top provided with an opening 12 through which liquid may be supplied to the tube and through which atmospheric pressure may enter the tube.

A tubular base 13 is disposed in alinement with the bottom of the glass tube and is provided at the top with a flange 14 from the edge of which a flange 15 extends upwardly concentric with the bore 16 of the tubular base.

A rod 17 is slidably disposed in the bore 16 of the tubular base and terminates at the top in a piston 18 which forces the liquid upwardly in the capillary glass tube 10. The liquid is prevented from passing below the piston by a flexible diaphragm 19 which is impervious to the liquid. The diaphragm overlaps the bottom of the piston and is sealed thereto as shown at 20. The diaphragm extends upwardly and outwardly from the piston and has its outer edge clamped and sealed in a metal washer 21 of U shape in cross section. The metal washer forms an outer seal for the space 22 occupied by the liquid below the capillary 10. The upper edge of the flange 15 of the tubular base is separated from the washer 21 by a washer 23 formed of compressible material, such as rubber, or a compression spring. The tube and base are assembled through the medium of a cap member 24 having a bore 25 to receive the lower end of the tube and the tube is sealed in the bore by a sealing medium 26 of any preferred type. The cap is provided on the bottom with an external flange 27. A flange nut 28 is threadedly engaged with the flange 27 and overlaps the outwardly extending flange 14 of the tubular base.

The tip 29 of the rod 17 is conical in shape and in order that the conical tip may be readily viewed when placed on the work to be measured one side of the tubular base is beveled as shown at 30 to expose the tip. The bevel extends to the bottom face of the tubular base. As best shown in Figure 4 the bottom face of the tubular base is provided with a transverse recess which forms spaced projections 31, the bottom faces of which lie in a common plane, and rest upon the work which in the present instance is a coating 32 of paint applied to a sheet 33 of glass.

A curved flat spring 34 is secured at the upper end to the tubular base by a split ring clip 35, the lower end of the spring is curved upwardly as shown at 36 to form a foot which extends in the same plane as the projections 31 of the base and holds the instrument from tipping forward when in use. The spring is of such tension that the curved foot 36 is held against the work as well as is the projection 31 of the tubular base.

A scale 37 is mounted on the rear side of the tube 10. One side of the scale is calibrated to show one-thousandth of an inch as indicated at 39, the other side of the scale is calibrated to show microns as indicated at 38. The scale is secured to the tube by substantially U-shaped clamps 40 having their legs passed through openings in the scale and clinched over the scale as shown at 41 in Figure 3.

For preventing the liquid from wasting through the opening 12 a cap 42 is provided, as shown best in Figure 5. The cap is provided with spring legs 43 adapted to embrace the outer side of the bulb 11. When the tube is in use for measuring, the cap is removed to permit air pressure entering the bulb on top of the liquid in the tube.

In operation the instrument is placed upwardly on a clean flat surface, such as plate glass so that the conical tip 29 of the rod 17 is in the same plane as the projections 31 of the tubular base. This forces the liquid to the top of the capillary tube 10. The top level of the liquid is then adjusted to the zero mark of the scale by turning the flange nut 28. A small hole, or a slot, 44 is then cut through the material 32 as shown in Figure 1 and the instrument is placed on the material so that the conical tip 29 of the rod 17 is in the slot. This allows the conical tip to lower from the plane of the projections 31 a distance equal to the thickness of the material. In so doing the piston 18 draws the level of the liquid down in the tube 10 in proportion to the movement of the piston 18. The small opening 12 at the top of the bulb 11 allows the liquid column to be under atmospheric pressure at all times.

From the above description it is thought that the construction and operation of the invention will be fully understood without further explanation.

What is claimed is:

A depthometer comprising, a capillary tube formed of transparent material, a cylindrical base receiving the tube, liquid in the tube, a piston having a stem slidably mounted in the base, a diaphragm secured to the base and extending underneath the piston to seal liquid in the tube in contact with the top of the piston, the base being beveled on one side to the bottom face thereof to expose the lower end of the stem to view, a scale associated with the tube, a bulb having a vent orifice at the top communicating with the tube for replenishing liquid in the tube and permitting atmospheric pressure to act on top of the liquid in the tube, and a curved resilient leg secured to the base and having a curved lower end in the plane of the bottom of the base to co-act with the base in supporting the tube in vertical position.

FLOYD ROBERTS.